(12) United States Patent
Galewski

(10) Patent No.: US 7,883,671 B2
(45) Date of Patent: Feb. 8, 2011

(54) PROCESS AND APPARATUS FOR MANUFACTURING A STYRENE POLYMER IN A MECHANICALLY STIRRED REACTOR

(75) Inventor: Jean-Marc Galewski, Noeux-les-Mines (FR)

(73) Assignee: Ineos Europe Limited, Hampshire (GB)

( * ) Notice: Subject to any disclaimer, the term of this patent is extended or adjusted under 35 U.S.C. 154(b) by 951 days.

(21) Appl. No.: 11/666,738

(22) PCT Filed: Nov. 10, 2005

(86) PCT No.: PCT/GB2005/004351

§ 371 (c)(1),
(2), (4) Date: May 2, 2007

(87) PCT Pub. No.: WO2006/054049

PCT Pub. Date: May 26, 2006

(65) Prior Publication Data

US 2008/0214751 A1 Sep. 4, 2008

(30) Foreign Application Priority Data

Nov. 16, 2004 (FR) .................................. 04 12099

(51) Int. Cl.
*B01J 19/18* (2006.01)
*B01J 19/00* (2006.01)
*C08F 2/00* (2006.01)

(52) U.S. Cl. ........................ 422/135; 422/131; 422/138; 422/198; 422/224; 422/225; 526/88; 526/89

(58) Field of Classification Search ................. 422/131, 422/135, 138, 198, 224, 225; 526/88, 89
See application file for complete search history.

(56) References Cited

U.S. PATENT DOCUMENTS

| | | | | |
|---|---|---|---|---|
| 3,679,651 | A | * | 7/1972 | Kii et al. .................... 526/64 |
| 4,243,636 | A | | 1/1981 | Shiraki et al. |
| 4,438,074 | A | * | 3/1984 | Wilt ....................... 422/135 |
| 7,607,821 | B2 | * | 10/2009 | Schmidt .................... 366/307 |
| 2003/0147790 | A1 | * | 8/2003 | Kawano et al. ............ 422/225 |

FOREIGN PATENT DOCUMENTS

| | | | |
|---|---|---|---|
| DE | 1501484 B | * | 3/1976 |
| EP | 0 591 556 A | | 4/1994 |
| WO | WO 2004/073847 A1 | * | 9/2004 |

* cited by examiner

*Primary Examiner*—Walter D Griffin
*Assistant Examiner*—Natasha Young
(74) *Attorney, Agent, or Firm*—Nixon & Vanderhye

(57) ABSTRACT

Process and apparatus for the (co) polymerization of styrene. The process is carried out by employing a liquid polymerization reaction mixture that includes styrene, in a mechanically stirred reactor in the form of a vessel comprising a side wall having the shape of a cylinder of revolution with a vertical axis (A), a bottom head and a top head that are joined to the side wall. The vessel is provided with a mechanical stirring device comprising (i) a central shaft of vertical axis coincident with the axis (A), connected to a drive system comprising a motor for rotating the central shaft, (ii) at least one baffle attached to the vessel. The baffle is away from the side wall of the vessel and takes the form of a cylinder of vertical axis and of rhomboidal cross section.

32 Claims, 9 Drawing Sheets

PROCESS AND APPARATUS FOR MANUFACTURING A STYRENE POLYMER IN A MECHANICALLY STIRRED REACTOR

This application is the U.S. National Phase of International Application PCT/GB2005/004351, filed 10 Nov. 2005, which designated the U.S. PCT/GB2005/004351 claims priority to French Application No. 0412099, filed 16 Nov. 2004. The entire content of these applications are incorporated herein by reference.

The present invention relates to a process and to an apparatus for manufacturing a styrene polymer in a mechanically stirred reactor.

BACKGROUND OF THE INVENTION

It is known to manufacture various styrene polymers, especially styrene homopolymers or copolymers, in particular:

a standard polystyrene (or standard PS), which is generally an amorphous polystyrene homopolymer, of amorphous structure and shiny appearance, and is rigid and transparent, often called "crystal PS" because of its clarity, and which generally has a weight-average molecular weight $M_w$ ranging from 150 000 to 400 000 daltons;

a high-impact polystyrene (or HIPS) which is impact resistant and of opaque appearance, this being a polystyrene modified by grafting onto a rubber or an elastomer, whether natural or synthetic, such as a polybutadiene, more precisely a polybutadiene/styrene copolymer;

a styrene/butadiene (SB) block copolymer or clear-impact polystyrene (CLIPS), which is rich in styrene, impact resistant and transparent in appearance; and an expandable polystyrene (or PSE) in the form of beads, containing a blowing agent, and intended to manufacture an expanded and moulded polystyrene, of cellular structure, which is rigid and of low density.

These styrene polymers result from an exothermic styrene polymerization reaction and are generally manufactured by bulk, solution, aqueous suspension or aqueous emulsion polymerization processes. These processes may be carried out continuously or in batch mode, in one or more mechanically stirred polymerization reactors.

In a bulk or solution styrene polymerization process the liquid polymerization reaction mixture becomes increasingly viscous as the polymerization reaction proceeds. The stirring of this mixture is an important element for controlling both heat exchange and quality of the polymer. One of the objectives of the present invention is therefore to provide a stirring device that is especially suitable for this process.

In the case of a process for manufacturing a high-impact polystyrene (HIPS), at least one prepolymerization step is carried out by bringing the styrene into contact with a rubber under conditions that allow both the styrene to be polymerized and the styrene polymer to be grafted onto the rubber. During this step, a phenomenon generally called a phase inversion occurs: the styrene polymer, which is initially insoluble in a continuous phase comprising the styrene and the rubber, becomes a continuous phase in which a new discontinuous phase appears, this essentially consisting of rubber nodules. During the phase inversion, the liquid polymerization mixture undergoes large variations in viscosity. The stirring of the liquid mixture is here too an important element for controlling the quality of the polymer, and especially the size and the size distribution of the rubber nodules included in the polystyrene matrix. One of the objectives of the present invention is to be able to provide a stirring device that is especially suitable for this process, in particular for the purpose of controlling the phase inversion step and the size and size distribution of the rubber nodules, independently of the presence of known additives, especially so as to influence the size of the nodules. One of the objectives is therefore to be able to provide a stirring device intended to prepare a high-impact polystyrene, especially one modified by grafting onto a rubber, and in which the rubber nodules have a relatively large size, for example ranging from 6 to 12 μm, in particular from 8 to 12 μm, with a relatively narrow size distribution.

In the case of a process for polymerizing styrene in aqueous suspension, especially intended for manufacturing expandable polystyrene beads, the stirring of the suspension is also an important element, which makes it possible to keep the polymer beads being formed in suspension and also to control the size and size distribution of the beads, in particular independently of the presence of a suspension stabilizer. One of the objectives of the present invention is therefore to be able to provide a stirring device that is especially suitable for this process.

It is known that these processes may be carried out in a mechanically stirred polymerization reactor, especially in the form of a vertical cylindrical vessel provided with a mechanical stirring device comprising a central rotation shaft and one or more stirring members attached to the shaft. A drive system connected to the central shaft and comprising a motor rotates the shaft and the stirring members. Various stirring members may be chosen depending on the desired movement of the liquid polymerization mixture, this movement being generated by the rotation of the shaft and the stirring members. The hydrodynamic state thus created in the vessel depends in general on the type of stirring member, on the geometrical factors of the vessel, such as the shape and dimensions of the vessel, and on the presence or otherwise of baffles attached to the vessel. It has been observed in particular that if the vessel is not provided with a baffle and if the stirring axis is coincident with the axis of the vessel, the movement of the liquid polymerization mixture has vertical velocity components that may be very small. A vortex may form, with the disadvantage of limiting the dissipating power of the stirring motor and a lack of homogeneity of the liquid polymerization mixture. In such a reactor, at least one baffle can be fitted, either attached to the wall of the vessel or away from the wall. A baffle away from the wall generally consists of a vertical bar having the shape of a vertical cylinder of revolution. However, it has been found that a baffle used in this way in one of these polymerization processes generally results in fouling of the baffle, especially in a deposit of heterogeneous substances on the face of the baffle on the opposite side from the face exposed to the movement of the liquid polymerization mixture. The particularly high viscosity of the liquid mixture and the possible variations in this viscosity over time may result in detachment (or tear-off) of this deposit, which is then not easily dispersed within the liquid mixture and will disturb the execution of the polymerization reaction. The result, the quality of the polymer is seriously affected. One of the objectives of the present invention is therefore to provide a stirring device which includes in particular at least one baffle, making it possible to reduce or even prevent fouling of the baffle and to manufacture a styrene (co)polymer whose quality is satisfactory and stable over time.

In the case of a process for polymerizing styrene in aqueous suspension, it has also been observed that, depending on the stirring member and the optional presence of a baffle, the radial velocity (especially the tangential or peripheral velocity) of the liquid polymerization mixture may become excessive and lead to loss or destabilization of the suspension, despite the presence of a suspension stabilizer. It may also result in the liquid polymerization mixture being stirred with a higher axial velocity, in such a way that an intake phenomenon may occur, during which part of the gaseous phase lying above the liquid phase is taken into the suspension, and finally a loss or destabilization of the suspension. One of the objectives of the present invention is therefore to provide a stirring device that allows the liquid polymerization mixture to be kept stable during aqueous suspension polymerization of the styrene.

SUMMARY OF THE INVENTION

A solution has been found that allows all of these problems to be solved, and it is this that forms the subject of the present invention. The solution essentially consists in employing a mechanical stirring device that includes at least one baffle in a reactor intended for carrying out one of the styrene polymerization processes as described above.

The present invention firstly relates to a process for the (co)polymerization of styrene, carried out by employing a liquid polymerization reaction mixture that includes styrene, in a mechanically stirred reactor in the form of a vessel comprising a side wall having the shape of a cylinder of revolution with a vertical axis (A), a bottom head and a top head that are joined to the side wall, the vessel being provided with a mechanical stirring device comprising (i) a central shaft of vertical axis coincident with the axis (A), connected to a drive system comprising a motor for rotating the central shaft, (ii) at least one stirring member attached to the central shaft and (iii) at least one baffle attached to the vessel, which process is characterized in that the baffle is away from the side wall of the vessel and takes the form of a cylinder of vertical axis and of cross section chosen from one of the three following shapes:
- a first shape comprising a rhombus possessing a long diagonal and a short diagonal, which have respective lengths (D) and (d) such that the ratio (d/D) is chosen within a range from 0.1/1 to 0.9/1, the short diagonal being directed along a radial direction with respect to the axis (A) or along a direction making an angle ($\alpha$) of greater than 0 and less than or equal to 45° to the said radial direction;
- a second shape comprising a rhombus identical to that of the first shape, except that each of the two acute angles located at the ends of the long diagonal is replaced with an identical or different circular arc, having a centre located on the long diagonal, a radius of length (r) such that the ratio (2r/d) is chosen within a range from 0.1/1 to 0.8/1, and two ends contiguous with the two respective sides of the acute angle; or
- a third shape comprising a rhombus identical to that of the second shape, except that only the acute angle located at the end of the long diagonal and facing in the opposite direction to the rotation of the central shaft is replaced with the circular arc.

DETAILED DESCRIPTION OF PREFERRED EMBODIMENTS

Figure 1:
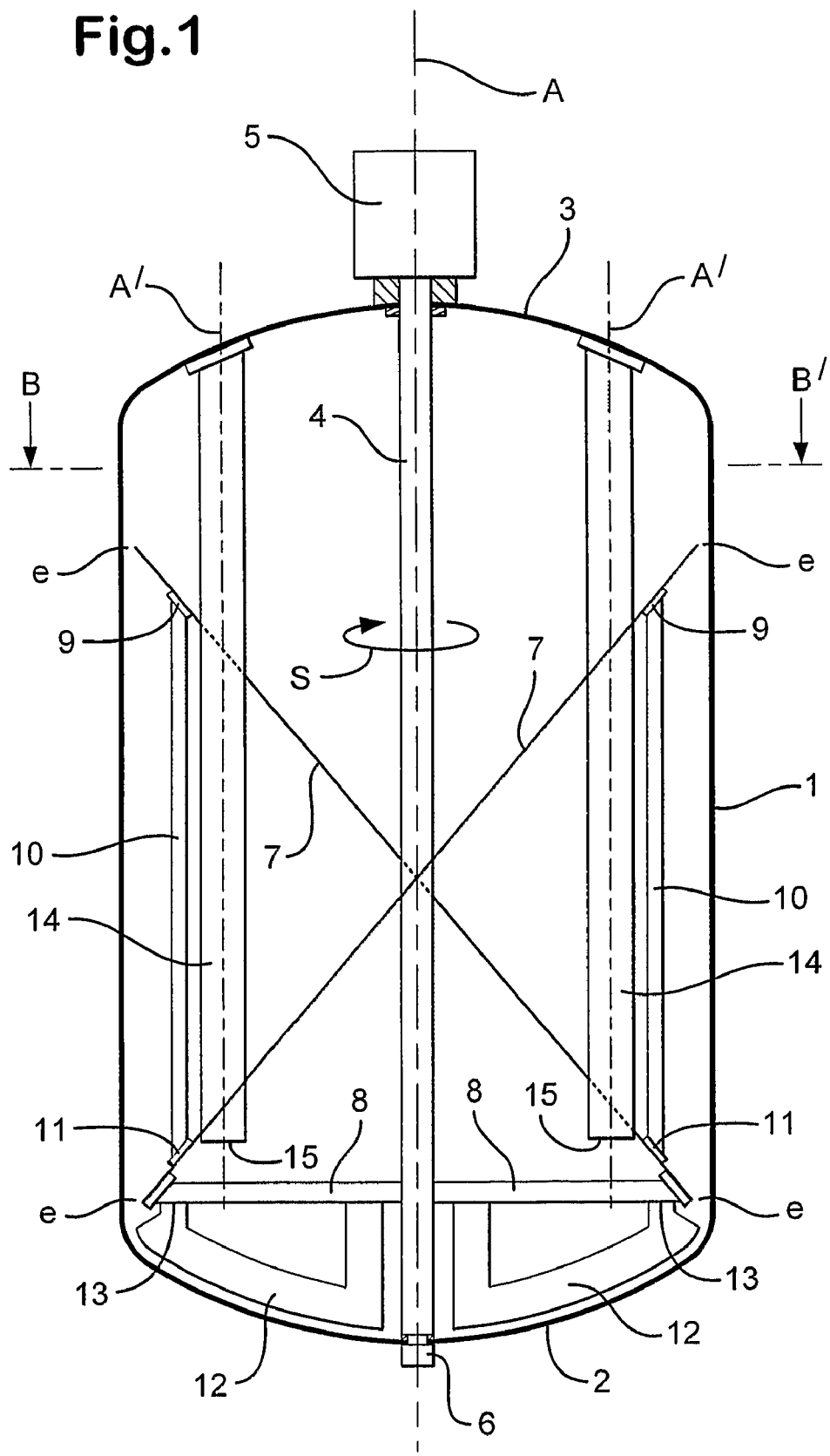
FIG. 1 shows schematically a mechanically stirred reactor used in particular in a process for the bulk or solution (co) polymerization of styrene. The reactor has the shape of a vessel provided with a mechanical stirring device according to the invention, comprising a central shaft, a stirring member generating axial or essentially axial flow having the shape of a double helix, and four baffles.

The vessel of the reactor comprises a side wall having the shape of a cylinder of revolution with a vertical axis (A) and a diameter ($\Delta$). The term "cylinder of revolution with a vertical axis" is understood in general to mean the envelope generated by a straight line segment that is moved vertically, parallel to itself, standing on a circle. The side wall of the vessel is in particular joined to a bottom head and to a top head, in such a way that the vessel may have a total height (H) and a diameter ($\Delta$) such that the ratio (H/$\Delta$) may range from 0.5/1 to 5/1, preferably from 1/1 to 4/1 and especially from 1.5/1 to 3/1. The liquid polymerization reaction mixture may occupy a portion of the vessel over a height (h) in such a way that the ratio (h/$\Delta$) may be chosen within a range from 0.25/1 to 3/1, preferably from 0.5/1 to 2.5/1.

The side wall of the vessel is in particular joined via its lower and upper circular bases to a bottom head and to a top head, respectively. The bottom head and the top head may have the same shape or a different shape, especially one chosen from a circular plane, hemispherical or substantially hemispherical, elliptical or basket-handle arch surface. They may include orifices for introducing the products and additives needed for the styrene (co)polymerization and/or for removing the liquid polymerization reaction mixture and the products resulting from the (co)polymerization reaction. The top head can be removed and is joined to the upper circular base of the side wall of the vessel, especially by means of a set of flanges, seals and a clamping system. The vessel may be provided with an outer jacket, connected to a heating and/or cooling device capable of heating and/or cooling the liquid polymerization reaction mixture.

The reactor vessel is also provided with a mechanical stirring device comprising a central shaft of vertical axis coincident with the axis (A) of the vessel. The central shaft is connected to a drive system comprising a motor for rotating the shaft, especially in a rotation direction (S). The central shaft may be a tubular shaft or a solid shaft. In particular, it is connected via one of its ends to the drive system, either via the bottom head or, preferably, via the top head of the vessel. The other end of the central shaft may be free or held by a guiding system, such as a socket or a bearing. The guiding system may be placed in that portion of the vessel on the opposite side from where the drive system is attached. The motor rotates the central shaft at a relatively low speed, which may range from 10 to 50 revolutions per minute, preferably 12 to 45 revolutions per minute. The stirring device may be designed to be able to rotate the central shaft in either direction of rotation, or preferably constantly in the same direction of rotation (S).

The stirring device also includes at least one stirring member attached to the central shaft. The stirring member may be chosen from stirring members generating radial flow or, preferably, from stirring members generating axial or essentially axial flow. In general, a stirring member generating radial flow provides a flow substantially perpendicular to the central shaft and can create substantial shear effects. In the case of a process for manufacturing a styrene (co)polymer carried out in bulk, in solution, in aqueous suspension or in aqueous emulsion, a stirring member generating radial flow can generate a moment of the polymerization mixture with a large tangential component. Thus, one or more stirring members generating radial flow (optionally with a tangential component) may be chosen from turbine impellers with straight or curved blades, disc turbine impellers of the "Rushden" type and with straight or curved blades, anchor stirrers and fine stirrers.

In the case of a process for (co)polymerizing styrene in aqueous suspension, used in particular to manufacture expandable polystyrene beads, a stirring member generating radial flow may produce shear effects so strong that it becomes difficult to maintain the suspension and to control the size and size distribution of the beads. In the case of a process for (co)polymerizing styrene in bulk or in solution, used in particular to manufacture a high-impact polystyrene, a stirring member generating radial flow may produce shear effects such that it is difficult to control the phase inversion step and the size and size distribution of the rubber nodules. It is also preferable to use, in all cases, a stirring member generating axial or essentially axial flow, which generates a relatively low shear rate, possibly ranging from 2 to 60 $s^{-1}$, preferably 5 to 50 $s^{-1}$, while still providing sufficient stirring capacity of the liquid polymerization mixture. A stirring member generating axial or essentially axial flow generally creates a movement of the liquid polymerization mixture in an axial or substantially axial direction, that is to say along a vertical or substantially vertical direction, either upwards or downwards, while still ensuring substantial circulation of the liquid mixture and consequently sufficient mixing capacity. In particular, it is possible to use a stirring member generating an essentially axial flow that has a predominantly axial component and a secondary radial component. One or more stirring members generating axial or essentially axial flow may be chosen from dual-flow screw impellers, inclined-blade turbine impellers, screw impellers with thin-profile blades or profiled blades, single-spiral or double-spiral Archimedian screws and single-, double-, triple- or quadruple-helical ribbon stirrers, optionally combined with an Archimedian screw. It is preferred to use one or more stirring members generating axial or essentially axial flow chosen from inclined-blade turbine impellers and single-, double- or triple-helical ribbon stirrers.

Thus, for example, in the case of a process for (co)polymerizing styrene in aqueous suspension, used in particular to manufacture expandable polystyrene beads, it may be advantageous to use one or more stirring members generating axial or essentially axial flow, especially a low shear rate as mentioned above, with a relatively high mixing capacity. The stirring member may be chosen in particular from dual-flow screw impellers and preferably from screw impellers with thin-profile blades or profiled blades, inclined-blade turbine impellers and especially turbine impellers having 2 to 6 blades, in particular 4 to 6 blades, the blades having in particular an angle of inclination to a horizontal plane ranging from 20 to 70°, preferably 30 to 60°, in particular 40 to 50°. The central rotation shaft to which the stirring member is attached may rotate at a speed ranging from 10 to 50 revolutions per minute, preferably 15 to 45 revolutions per minute.

In the case of a process for the bulk or solution (co)polymerization of styrene, used in particular to manufacture a standard polystyrene or a high-impact polystyrene, it may be advantageous to use one or more stirring members generating axial or essentially axial flow, having in particular a relatively low shear rate, possibly ranging from 2 to 60 $s^{-1}$, preferably 5 to 50 $s^{-1}$, while still ensuring sufficient mixing capacity. The stirring member may be chosen in particular from single-spiral or double-spiral Archimedian screws and preferably from single-, double-, triple- or quadruple-helical ribbon stirrers, optionally combined with an Archimedian screw. Particularly, it is preferred to use a single- double- or triple-helical ribbon stirrer, especially in the absence of an Archimedian screw. A double-helical ribbon stirrer having especially a pitch (p) and a diameter ($\delta$) may more particularly be chosen in such a way that the ratio (p/$\delta$) may be chosen within a range from 0.35 to 3.5, preferably from 0.5 to 3, for example from 1 to 2.8. The central rotation shaft to which the stirring member is attached may rotate at a speed ranging from 10 to 45 revolutions per minute, preferably 12 to 40 revolutions per minute.

The distance between the external edge of the stirring member and the side wall of the vessel, also called the width of the stirring member/wall gap (e), may be in certain cases an important factor in the stirring. Thus, in a process for the bulk or solution (co)polymerization of styrene, carried out using a mechanical stirring device comprising a stirring member generating axial or essentially axial flow, the width of the stirring member/wall gap (e) may be very small. In particular, the width (e) may be chosen in such a way that the ratio (e/$\Delta$) between the width of the stirring member/wall gap (e) and the internal diameter ($\Delta$) of the vessel is less than or equal to 0.08, preferably less than or equal to 0.05, in particular chosen within a range from 0.005 to 0.08, preferably 0.005 to 0.05. Thus, to give an example, a stirring member generating axial or essentially axial flow, chosen from single- double- or triple-helical ribbon stirrers, may advantageously rotate near the side wall of the vessel preferably a ratio (e/$\Delta$) of less than or equal to 0.05, in particular chosen within the range from 0.005 to 0.05.

A stirring device comprising at least one stirring member generating axial or essentially axial flow, for example a single-, double- or triple-helical ribbon stirrer, attached to the central rotation shaft, may advantageously be provided with a bottom stirring member, fixed in particular to the same central shaft. The bottom stirring member may have the shape of an anchor, especially with a very small stirring member/bottom head gap width, in particular similar to the stirring member/wall gap width (e) as described above.

The central rotation shaft to which a stirring member is attached, preferably one generating axial or essentially axial flow, such as an inclined-blade turbine impeller or a single-, double- or triple-helical ribbon stirrer, can rotate in a rotation direction (S) such that the liquid polymerization reaction mixture descends towards the bottom of the vessel along the axis (A) and then rises back up, along the side wall, thanks to the stirring member. The shaft may also rotate in the opposite direction of rotation in such a way that the liquid mixture rises to the top of the tank along the axis (A) and then descends again, along the side wall, thanks to the stirring member. In general, the first variant is preferred.

The stirring device includes at least one baffle that is away from the side wall of the vessel and has the shape of a cylinder of vertical axis. The baffle is attached to the vessel, especially via one of its ends, for example via its lower end at the bottom of the vessel, or preferably via its upper end at the top of the vessel. The baffle may be attached via the other end of the side wall of the vessel. Reinforcements, such as longitudinal beams, may connect the baffle to the vessel and/or to other baffles. The points of attachment of the baffle and the optional reinforcements are chosen so as not to disturb the rotation of the central shaft and of the stirring members. The vertical axis of the baffle may be remote from the axis of the central shaft, for example at a distance (l) such that the ratio of (l) to the internal diameter ($\Delta$) of the vessel is chosen within a range from 0.1 to 0.8, preferably 0.2 to 0.6. The baffle may be partly or completely immersed in the liquid polymerization reaction mixture. Thus, the baffle, having a length (L), may be immersed over at least a portion of the height (h) of the liquid reaction mixture, for example with a ratio (L/h) ranging from 0.5/1 to 1.2/1. In a vessel having a height (H), the length (L) of the baffle may be such that the ratio (L/H) is chosen within a range from 0.5/1 to 0.9/1.

The baffle is in the form of a cylinder, for example a solid or hollow cylinder. A baffle having the form of a hollow cylinder is preferred and, in this case, the end of the cylinder not attached to the vessel may advantageously be closed. A baffle of hollow cylindrical shape may preferably be reinforced with a solid internal structure of the cellular, tubular, compartmentalized and/or internal double-wall jacketed type, so as in particular to withstand the high external stresses and pressures exerted by the movement of the liquid polymerization reaction mixture. The hollow internal portion of the baffle may include in particular a jacket, this being advantageously used for circulation of a heat-transfer fluid, capable of removing and/or delivering heat to the liquid polymerization reaction medium. In this case, the baffle may be connected on the outside of the vessel to a heating and/or cooling device and thus be used as a heat exchanger. A baffle with an internal structure of the double-wall jacketed type is particularly suitable for the process for (co)polymerizing styrene in aqueous suspension, especially for manufacturing an expandable polystyrene in the form of beads. Thus, for example, such baffles may contribute to the thermal exchange capability to an amount possibly ranging up to 40 or even 60% of the total thermal exchange capability of the reactor, especially when 4 to 6 baffles of this type in a reactor having a volume possibly of up to 100 or even 150 m$^3$ are used.

The baffle takes the form of a cylinder of vertical axis and of cross section chosen from one of the three following shapes.

The first shape comprises a rhombus processing a long diagonal and a short diagonal having respective lengths (D) and (d). The ratio (d/D) of the lengths of the diagonals may be chosen within a range from 0.1/1 to 0.9/1, preferably from 0.2/1 to 0.8/1 and especially from 0.25/1 to 0.65/1. The short diagonal is directed along a radial direction with respect to the axis (A) of the vessel, or along a direction making an angle ($\alpha$) of greater than 0 and less than or equal to 45°, preferably less than or equal to 30°, to the said radial direction, in such a way that the movement of the liquid mixture is especially directed partly towards the side wall of the vessel. As a result, since the long diagonal is perpendicular to the short diagonal, the two acute angles located at the ends of the long diagonal are placed in such a way that one of these angles is placed substantially facing the rotation direction (S) of the central shaft and the other angle substantially facing the opposite direction to (S).

The second shape of the cross section of the baffle is generally more advantageous and is preferred over the first shape. The second shape comprises a rhombus identical to that of the first shape, except that each of the two acute angles located at the ends of the long diagonal is replaced with the same or a different circular arc. Each of the two circular arcs has a centre located on the long diagonal and possesses a radius of different, or preferably the same, length (r). The radius of the circular arc has in particular a length (r) such that the ratio (2r/d) is chosen within a range from 0.1/1 to 0.8/1, preferably 0.2/1 to 0.7/1 and especially 0.35/1 to 0.65/1. The two ends of the circular arc are contiguous with the two respective sides of the acute angle. Advantageously, each end of the circular arc is contiguous with the respective side of the acute angle which the arc joins, along a tangent to the circular arc which is, at the joining point, coincident with the direction of the said side.

The third shape of the cross section of the baffle comprises a rhombus identical to that of the second shape, except that only the acute angle located at the end of the long diagonal and facing the opposite direction to the rotation of the central shaft (especially opposite the rotation direction (S)) is replaced with the circular arc, as described above in the case of the second shape. Advantageously, each end of the circular arc is contiguous with the respective side of the acute angle to which the arc is joined, along a tangent to the circular arc which is, at the joining point, coincident with the direction of the said side.

The use of such a baffle in a mechanically stirred reactor, especially in a styrene (co)polymerization reaction carried out according to a bulk, solution, aqueous suspension or aqueous emulsion process, makes it possible to avoid the problems described above, especially the problems of baffle fouling, in particular the deposition of heterogeneous substances on the face of the baffle on the opposite side to that facing the direction of rotation of the central shaft.

It has also been found that a baffle having a cross section preferably in the second form exhibits great mechanical strength when subjected to the external stresses and pressures exerted in particular by the movement of the liquid polymerization reaction mixture.

Finally, it has been observed that a baffle as described above, used in a mechanically stirred reactor in particular for (co)polymerizing styrene in a bulk, solution, aqueous suspension or aqueous emulsion process, can considerably reduce the radial component and in contrast favour the axial component of the movement of the liquid polymerization mixture. Consequently, the baffle may especially prevent the entire mass of the liquid mixture from rotating uniformly about the central rotation axis.

The polymerization reactor may include one or more baffles of this type, preferably 2 to 6 baffles, especially distributed equidistantly, and at the same distance (l) from the axis of the central rotation shaft, in particular as described above.

The styrene (co)polymerization process may be carried out by employing a liquid polymerization reaction mixture at least partly in the mechanically stirred reactor, as described above. The styrene (co)polymerization may be a styrene homopolymerization, or a styrene copolymerization with at least one comonomer chosen from vinylaromatic monomers other than styrene, for example from $\alpha$-methylstyrene, a styrene halogenated in the aromatic ring, and a styrene alkylated in the aromatic ring, or else a polymerization of styrene with partial grafting onto a rubber or an elastomer, whether natural or synthetic, such as a polybutadiene. The styrene (co)polymerization is generally a radical polymerization reaction, initiated thermally or by means of a polymerization initiator, in particular a free radical generator, chosen in particular from peroxides, hydroperoxides, peroxycarbonates, percetals, peresters and azo compounds. It may also be an ionic polymerization reaction, carried out in the presence of an anionic or cationic polymerization initiator chosen, for example, from n-butyllithium, sec-butyllithium, cumylpotassium, diphenylmethylpotassium, fluorenylpotassium and lithium chloride.

Depending on whether the styrene (co)polymerization is carried out by a bulk, solution, aqueous emulsion or suspension process, the liquid polymerization reaction mixture contained in the mechanically stirred reactor may comprise, respectively:
- styrene, and optionally at least one comonomer, a natural or synthetic rubber, such as a polybutadiene, and/or at least one polymerization initiator, especially a free radical generator, such as those mentioned above; or
- styrene, an organic, preferably aromatic, solvent, chosen especially from benzene and alkylbenzenes (or alkylated derivatives of benzene), in particular chosen from toluene, ethylbenzene, orthoxylene, metaxylene, paraxylene and cumene, and optionally at least one comonomer, a natural or synthetic rubber, such as a polybutadiene, and at least one polymerization initiator, especially a free radical generator, such as those mentioned above; or else
- styrene, water, at least one suspension or emulsion stabilizer, especially one chosen from organic suspension or emulsion agents, such as polyvinyl alcohols, hydroxyethylcellulose, methylcellulose, sodium dodecylbenzene sulphonate, starch, polyacrylamides or polyvinylpyrrolidones, or chosen from inorganic suspension or emulsion agents, such as alumina, magnesium silicate, magnesium oxide, zinc oxide, tricalcium phosphate, barium phosphate, aluminium phosphate, magnesium pyrophosphate, calcium carbonate or calcium fluoride, and optionally at least one comonomer, a natural or synthetic rubber, such as a polybutadiene, and/or at least one polymerization initiator, especially a free radical generator, such as those mentioned above.

The styrene (co)polymerization may be carried out by employing the liquid polymerization reaction mixture in the mechanically stirred reactor under conditions for developing the (co)polymerization reaction, especially temperature and pressure conditions capable of initiating and/or developing the styrene (co)polymerization reaction and optionally of grafting a styrene (co)polymer onto a rubber, such as a polybutadiene. Thus, the polymerization temperature may be chosen within a range from 80 to 200° C., preferably 90 to 190° C. and especially 90 to 180° C., in particular in the case of a bulk or solution process, or from 80 to 150° C., preferably 85 to 140° C., in particular in the case of an aqueous emulsion or suspension process. The absolute pressure, especially in the mechanically stirred reactor, may be from 0.1 to 10 MPa, preferably from 0.2 to 5 MPa.

The liquid polymerization mixture may furthermore include one or more additives chosen from: chain stoppers, such as mercaptans or the dimer of alpha-methylstyrene; fire retardants, such as halogenated, preferably brominated, hydrocarbons; crosslinking agents, such as butadiene or divinylbenzene; lubricants; plasticizers; antistatic agents and infrared absorbers and/or reflectors, such as mica, titanium dioxide; metal powders, such as aluminium powder; carbon black; graphite; expandable graphite or expanded graphite. In the manufacture of an expandable polystyrene, especially in the form of beads, it is also possible to choose one or more other additives taken from: blowing agents, such as $C_4$ to $C_6$ alkanes, fluorohydrocarbons, carbon dioxide or water; coating agents; mould release agents; agents for accelerating the rate of expansion, such as petroleum waxes, especially paraffin waxes; and nucleating agents, such as synthetic waxes, especially polyolefin waxes or Fischer-Tropsch waxes.

The styrene (co)polymerization may be carried out entirely in the mechanically stirred reactor, especially for manufacturing an expandable polystyrene, in particular in the form of beads, for example in an aqueous suspension process.

The styrene (co)polymerization, especially in a bulk or solution process, may also be carried out partly and, preferably initially, in the mechanically stirred reactor according to the invention, for example in the form of a prepolymerization, it being possible for the remainder of the polymerization to be carried out in one or more other reactors, especially chosen from mechanically stirred reactors, static mixer/reactors and plug-flow reactors. Thus, a styrene prepolymerization reaction may be carried out, optionally in the presence of a rubber such as polybutadiene, in the mechanically stirred reactor according to the invention until, for example, a degree of conversion into polymer of at most 50%, preferably at most 40%, is reached. In the case of the manufacture of a high-impact polystyrene, the styrene (co)polymerization is carried out in bulk and in the presence of a rubber, such as a polybutadiene, and may advantageously be carried out in the mechanically stirred reactor according to the invention until the phase inversion step occurs, and then to continue and complete the (co)polymerization in one or more other reactors chosen in particular from mechanically stirred reactors, static mixer/reactors and plug-flow reactors. Thanks to the mechanically stirred reactor according to the invention, it is possible to control the phase inversion step and to obtain rubber nodules of the desired size and size distribution, in particular a large size, possibly ranging from 6 to 12 µm, especially 8 to 12 µm, and of narrow size distribution.

The present invention also relates to a polymerization apparatus, especially capable of (co)polymerizing styrene, comprising a mechanically stirred reactor in the form of a vessel comprising a side wall having the shape of a cylinder of revolution with a vertical axis (A), a bottom head and a top head that are joined to the side wall, the vessel being provided with a mechanical stirring device comprising (i) a central shaft of vertical axis coincident with the axis (A), connected to a drive system comprising a motor for rotating the central shaft, (ii) at least one stirring member attached to the central shaft and (iii) at least one baffle attached to the vessel, which apparatus is characterized in that the baffle is away from the side wall of the vessel and takes the form of a cylinder, solid or hollow, of vertical axis and of cross section chosen from one of the three following shapes:
- a first shape comprising a rhombus possessing a long diagonal and a short diagonal, which have respective lengths (D) and (d) such that the ratio (d/D) is chosen within a range from 0.1/1 to 0.9/1, the short diagonal being directed along a radial direction with respect to the axis (A) or along a direction making an angle (α) of greater than 0 and less than or equal to 45° to the said radial direction;
- a second shape comprising a rhombus identical to that of the first shape, except that each of the two acute angles located at the ends of the long diagonal is replaced with an identical or different circular arc, having a centre located on the long diagonal, a radius of length (r) such that the ratio (2r/d) is chosen within a range from 0.1/1 to 0.8/1, and two ends contiguous with the two respective sides of the acute angle; or a third shape comprising a rhombus identical to that of the second shape, except that only the acute angle located at the end of the long diagonal and facing in the opposite direction to the rotation of the central shaft is replaced with the circular arc.

The details, variants and preferences of the various elements of the apparatus were described above.

The present invention also relates to the use of the apparatus described above in a styrene polymerization process, using a process chosen from bulk, solution, aqueous suspension or aqueous emulsion processes, especially from the continuous or batch manufacture of the styrene homopolymer, or a styrene copolymer with at least one comonomer chosen from vinylaromatic monomers other than styrene, in particular those mentioned above, or a high-impact polystyrene, especially modified by grafting onto a natural or synthetic rubber, such as a polybutadiene, or else an expandable polystyrene, especially in the form of beads. The processes for manufacturing these polymers were described above.

FIG. 1 shows schematically a mechanically stirred reactor used especially in a process for the bulk or solution (co)polymerization of styrene, in particular for manufacturing a standard polystyrene or, preferably, a high-impact polystyrene. The reactor has the form of a vessel comprising a side wall (1) having the shape of a cylinder of revolution with a diameter (Δ) and a vertical axis (A), this being joined to a bottom head (2) and a top head (3), in such a way that the ratio of the total height (H) of the vessel to the diameter (Δ) is equal to 1.9. The liquid polymerization reaction mixture may occupy a height (h) of the vessel so that the ratio (h/Δ) is equal to 1.6.

The vessel is provided with a mechanical stirring device according to the invention, which comprises a central rotation shaft (4) having a vertical axis coincident with the axis (A). The central shaft (4) is connected via its upper end to the top head (3) and to a drive system comprising a motor (5) for rotating the central shaft (4), and, via its lower end to the bottom head (2) and to a guiding system (6), for example a socket. The central shaft (4) rotates at a speed of 15 revolutions per minute.

The mechanical stirring device also includes a stirring member (7) generating axial or essentially axial flow, this being attached to the central shaft (4) via a horizontal solid support (8). The stirring member (7) is in the form of a double helical ribbon stirrer, known by the commercial reference Paravisc Ekato® sold by Ekato (Germany) and having a pitch (p) and a diameter (δ) such that the ratio (p/δ) is equal to 2.5. It generates a shear rate of about $10\,s^{-1}$. The upper portion (9) of each of the two single helical ribbon stirrers is connected via a vertical solid support (10) to the lower portion (11) of the other single helical ribbon stirrer so as to stiffen the entire double helical ribbon stirrer (7). The distance between the external edge of the double helical ribbon stirrer and the side wall (1) of the vessel, also called the stirring member/vessel gap width (e) is such that the ratio (e/Δ) is equal to 0.01. The central shaft (4) rotates in a rotation direction (S) such that the liquid polymerization reaction mixture contained in the reactor descends towards the bottom head (2) of the vessel along the axis (A) and then rises back up along the side wall (1) thanks to the stirring member (7).

The mechanical stirring device also includes a bottom stirring member (12), fastened via its two ends (13) to the horizontal solid support (8). The bottom stirring member (12) has the shape of an anchor, the external edge of which is separated from the wall of the bottom head (2) of the vessel by a stirring member/bottom head gap width identical to that of the stirring member/wall gap (e).

The mechanical stirring device also includes four baffles (14) which are identical to one another, only two of which have been shown in FIG. 1. The baffles (14) are placed away from the side wall (1) of the vessel by a distance sufficient to allow the double helical ribbon stirrer (7) to pass. They are placed symmetrically with respect to the axis (A) of the vessel and at the same distance from one another. Each baffle (14) is in the form of a hollow cylinder, with a compartmentalized internal structure, having a vertical axis (A') away from the axis (A) of the central shaft (4) by a distance (l) such that the ratio (l/Δ) is equal to 0.33. The cross section of the baffle (14) corresponds to the second shape as described above and especially shown schematically in FIG. 4. The baffle (14) has a closed lower end (15) and an upper end (16) attached to the top head (3) of the vessel. It has a vertical length (L) such that it is immersed over a portion of the height (h) of the liquid polymerization reaction mixture contained in the reactor, and especially such that the ratio (L/h) is equal to 0.86.

Figure 2:
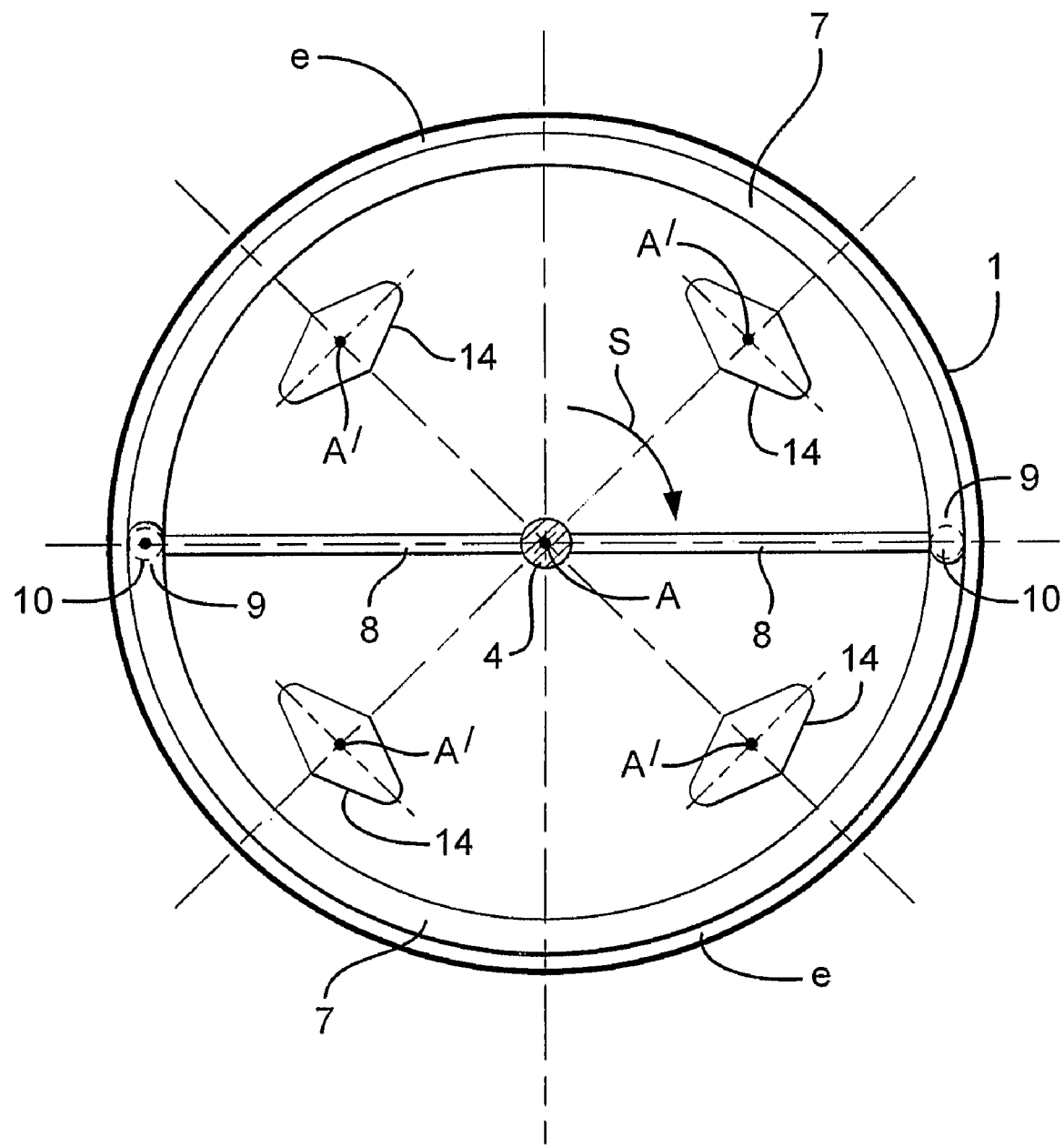
FIG. 2 is a vertical schematic view from the top in cross section on BB' of the reactor shown in FIG. 1.

FIG. 2 is a vertical schematic view from the top in cross section on BB' of the reactor shown in FIG. 1, in which view the elements common to the two figures have been identified by the same references. The reactor has the shape of a vessel comprising the side wall (1) of the cylinder of revolution of diameter (Δ) and a vertical axis (A). The vessel is provided with a mechanical stirring device that includes the central rotation shaft (4), which has a vertical axis, coincident with the axis (A), and which rotates in the rotation direction (S).

The mechanical stirring device also includes the stirring member (7) in the form of a double helical ribbon, known by the commercial reference Paravisc Ekato®. The double helical ribbon stirrer (7) is connected to the central rotation shaft (4) via the horizontal solid support (8). The upper portion (9) of each of the two single helical ribbons is connected via the vertical solid support (10) to the lower portion (11) of the other single helical ribbon so as to stiffen the entire double helical ribbon stirrer (7). The distance between the external edge of the double helical ribbon stirrer (7) and the side wall (1) of the vessel (called the stirring member/vessel gap width (e)) is such that the ratio (e/Δ) is equal to 0.01.

The mechanical stirring device also includes four baffles (14) which are identical to one another and are away from the side wall (1) of the vessel by a distance sufficient to allow the double helical ribbon stirrer (7) to pass between them and the side wall (1). The four baffles (14) are arranged symmetrically with respect to the axis (A) of the vessel and are equidistant apart. Each baffle (14) has the shape of a hollow cylinder having a vertical axis (A'). The vertical axis (A') is away from the axis (A) of the central shaft (4) by a distance (l) such that the ratio (l/Δ) is equal to 0.33. The cross section of the baffle (14) corresponds to the second shape as described above and shown schematically in FIG. 4. More particularly, the shape of the cross section of the baffle (14) comprises a rhombus having:

(i) a long diagonal and a short diagonal having respective lengths (D) and (d) such that the ratio (d/D) is equal to 0.46/1, the short diagonal being directed along a direction radial with respect to the axis (A); and (ii) each of the two acute angles located at the ends of the long diagonal being replaced with an identical circular arc, having a centre located on the long diagonal, a radius of length (r) such that the ratio (2r/d) is equal to 0.51/1, and two ends joined to the two respective sides of the acute angle.

Figure 3:
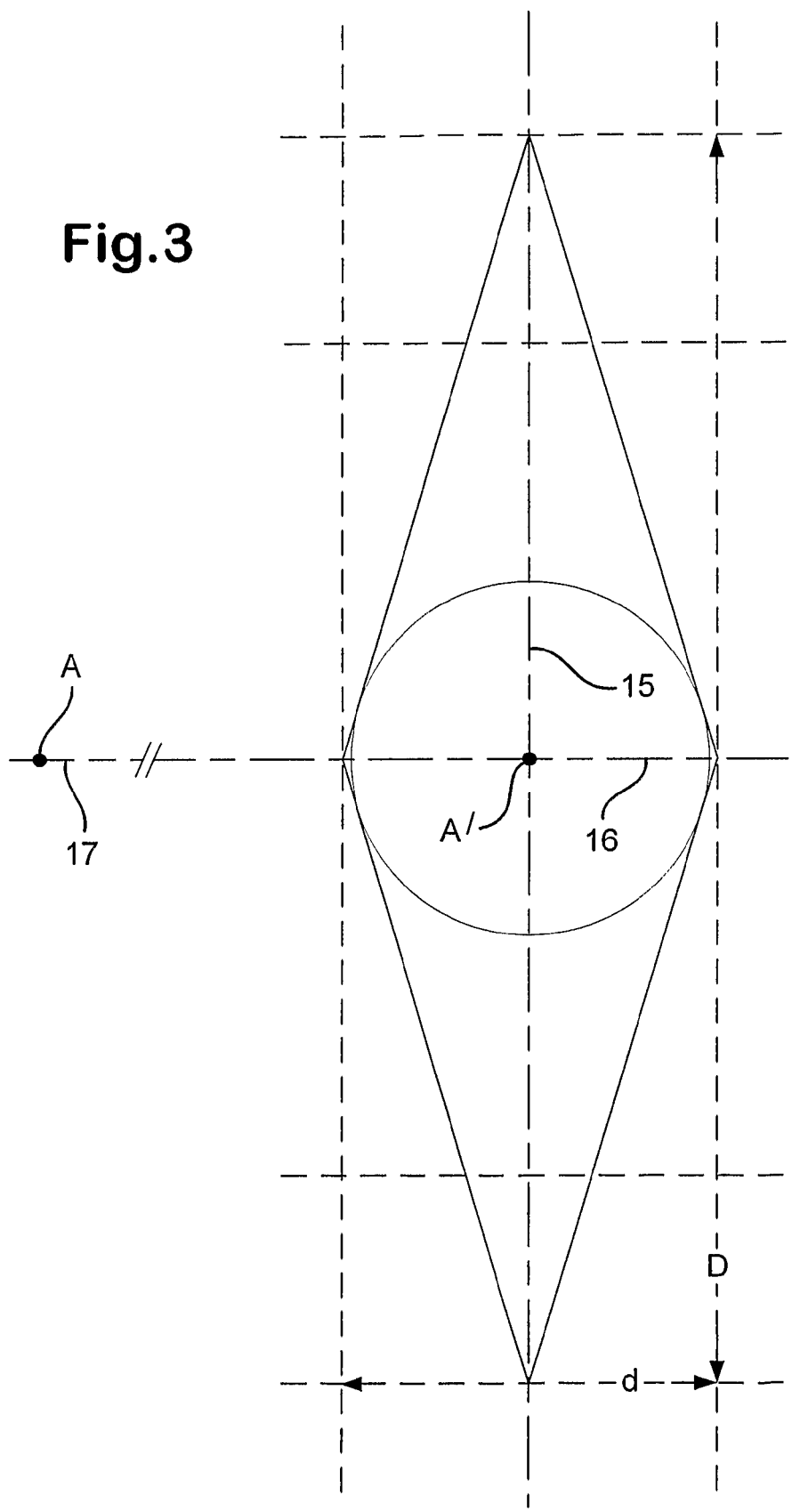
FIGS. 3, 4 and 5 show schematically the cross section of a baffle according to the invention, having one of the three respective shapes described above.

FIG. 3 shows schematically the cross section of a baffle according to the invention. The baffle has a shape comprising a cylinder having a vertical axis (A') and a cross section having the first shape as described above, that is to say the shape of a rhombus with a long diagonal (15) and a short diagonal (16) having respective lengths (D) and (d) such that the ratio (d/D) is equal to 0.31/1. The centre of the rhombus corresponds to the point through which the vertical axis (A') of the baffle passes. The short diagonal (16) is directed along a radial direction (17) with respect to the axis (A) of the vessel.

Figure 4:
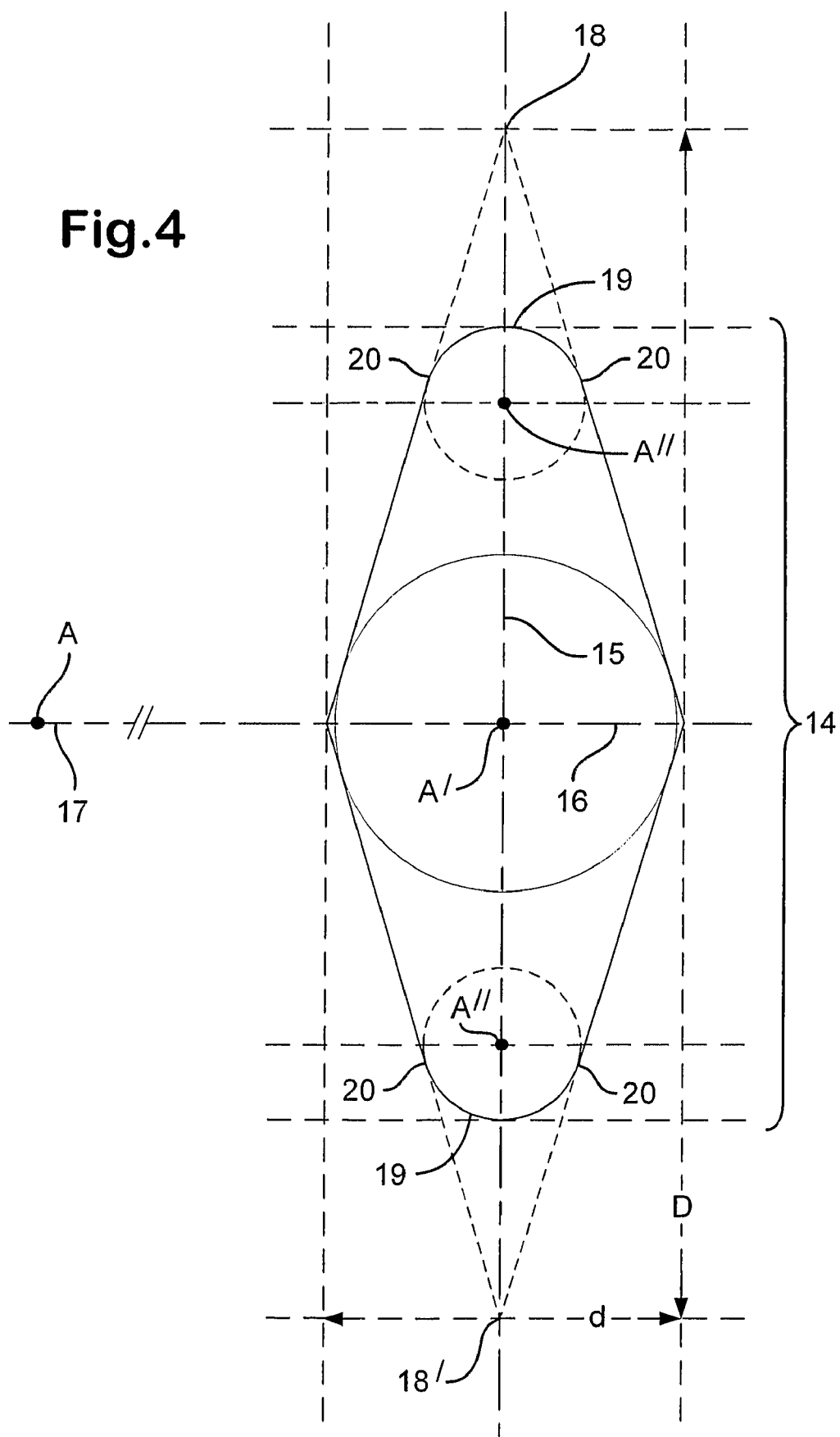

FIG. 4 shows schematically the cross section of a preferred baffle (14) according to the invention and as shown in FIGS. 1 and 2. The elements common to FIGS. 1, 2 and 4 are identified by the same references. The baffle (14) is a shape comprising a cylinder having a vertical axis (A') and a cross section having the second shape as described above, that is to say the shape of a rhombus having:

(i) a long diagonal (15) and a short diagonal (16) having respective lengths (D) and (d) such that the ratio (d/D) is equal to 0.46/1, the short diagonal (16) being directed along a radial direction (17) with respect to the axis (A) of the vessel, and the centre of the rhombus corresponding to the point through which the vertical axis (A') of the baffle passes; and (ii) each of the two acute angles (18) and (18') located at the ends of the long diagonal (15) being replaced with an identical circular arc (19), having a centre (A'') on the long diagonal (15), a radius of length (r) such that the ratio (2r/d) is equal to 0.51/1, and two ends (20) which join the respective two sides of the acute angle, to which sides the circular arc (19) is joined, in particular along a tangent to the circular arc (19) which is, at the joining point, coincident with the direction of the said sides.

Figure 5:
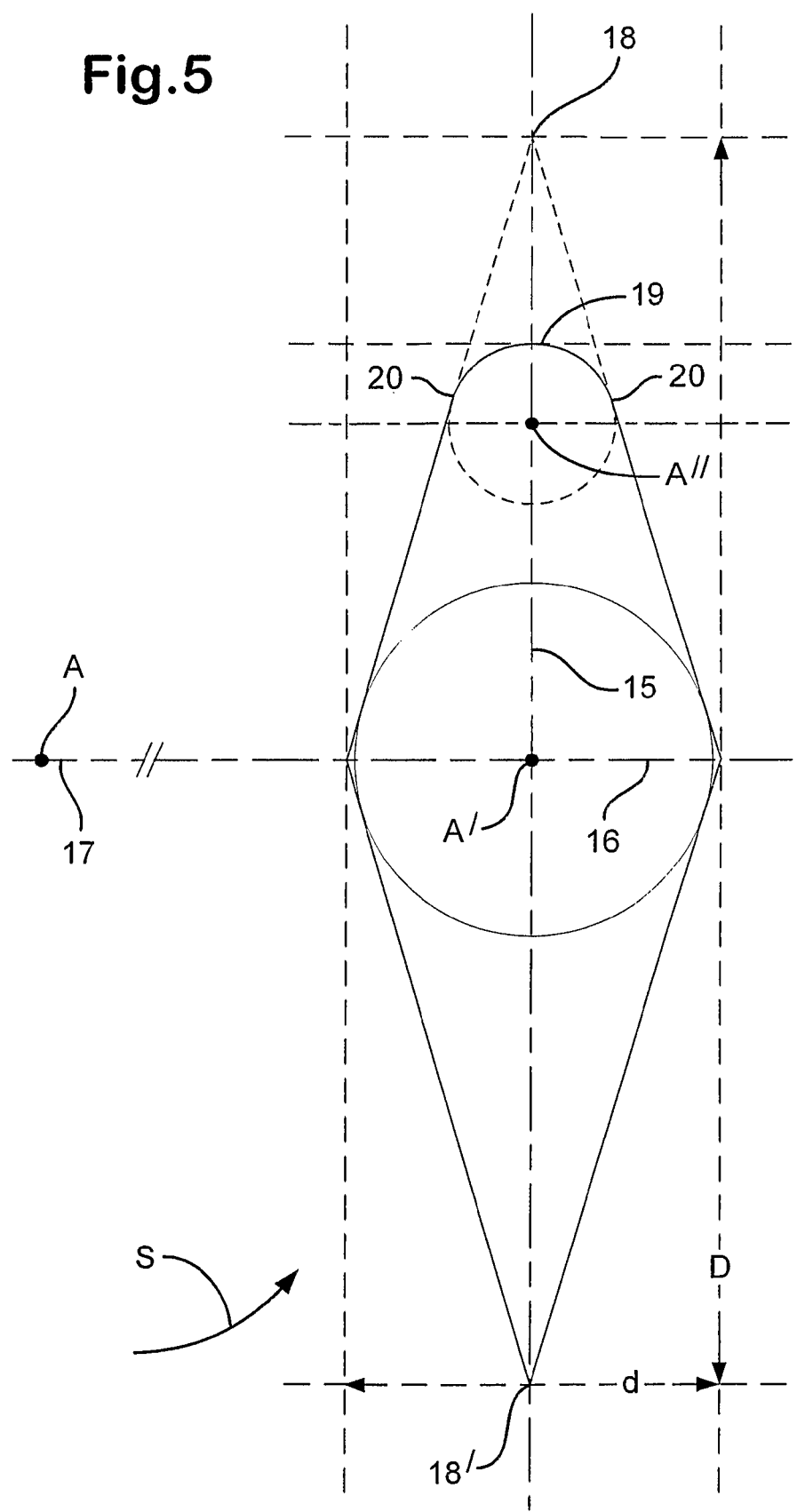

FIG. 5 shows schematically the cross section of a baffle according to the invention. The baffle has a shape comprising a cylinder having a vertical axis (A') and a cross section having the third shape as described above. This is a shape comprising a rhombus identical to that shown in FIG. 4, except that only the acute angle (18) located at the end of the long diagonal (15) and facing the opposite direction to the direction of rotation (S) of the central shaft (4) is replaced with the circular arc (19).

Figure 6:
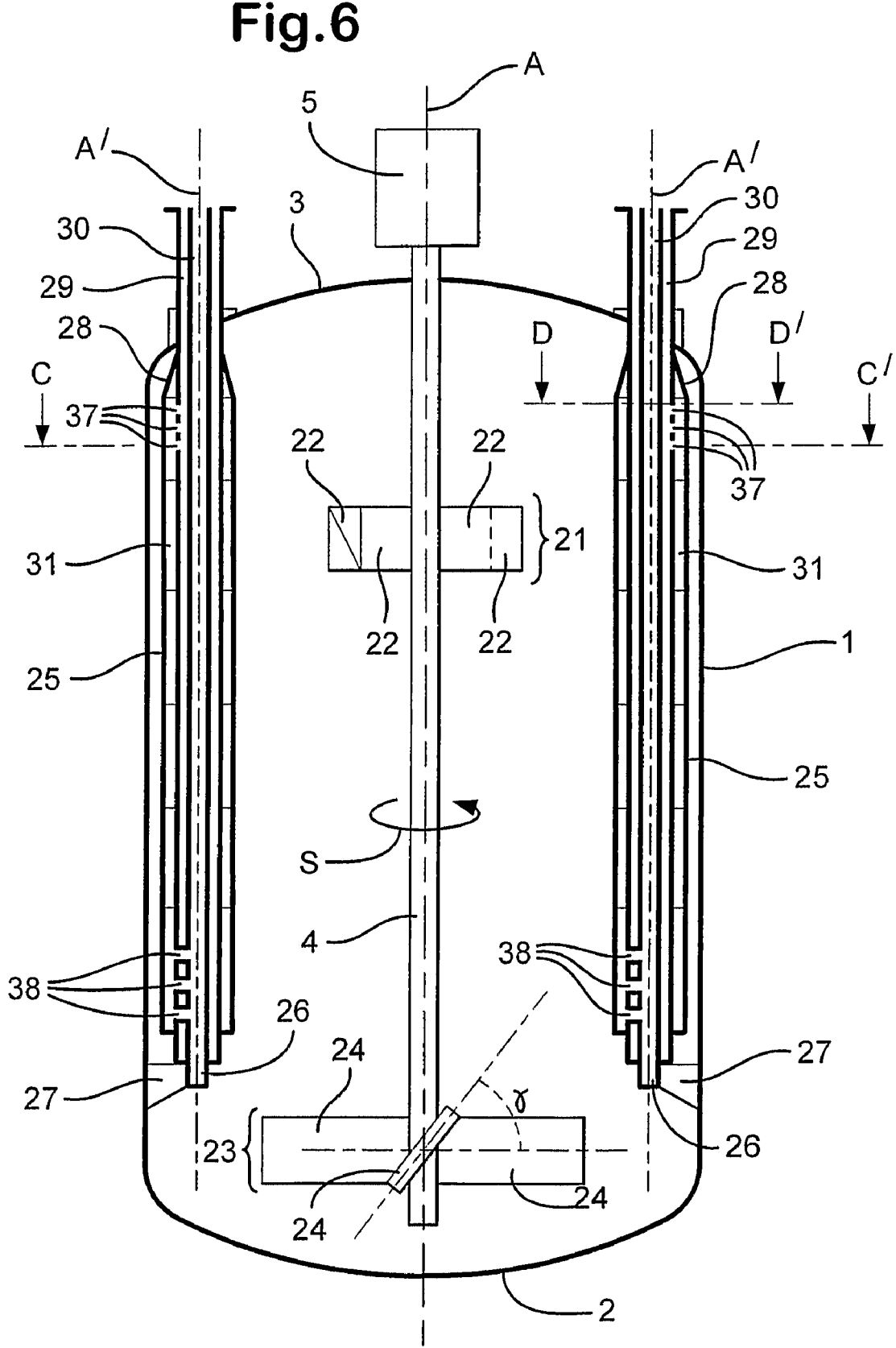
FIG. 6 shows schematically a mechanically stirred reactor used in particular in a process for (co)polymerizing the styrene in aqueous suspension. The reactor has the shape of a vessel provided with a mechanical stirring device according to the invention, comprising a central shaft, two stirring members generating axial or essentially axial flow, taking the form of a turbine impeller with four inclined blades, and four baffles comprising an internal structure of the double-wall jacketed type.

FIG. 6 shows schematically a mechanically stirred reactor used especially in a process for (co)polymerizing styrene in aqueous solution, in particular for manufacturing an expandable polystyrene in the form of beads. The reactor has the shape of a vessel comprising a side wall (1) having the shape of a cylinder of revolution of diameter ($\Delta$) and of vertical axis (A), which is joined to a bottom head (2) and to a top head (3), in such a way that the ratio of the total height (H) of the vessel to the diameter ($\Delta$) is equal to 1.8. The liquid polymerization reaction mixture may occupy a height (h) of the vessel in such a way that the ratio (h/$\Delta$) is equal to 1.2.

The vessel is provided with a mechanical stirring device according to the invention, which includes a central rotation shaft (4) having a vertical axis coincident with the axis (A). The central shaft (4) is connected via its upper end to the top head (3) and to a drive system comprising a motor (5) for rotating the central shaft (4) at a speed of 20 revolutions per minute.

The mechanical stirring device also includes a system of two stirring members generating axial or essentially axial flow, these being attached to the central rotation shaft (4). The first stirring member comprises an upper turbine impeller (21) having four inclined blades (22). Each inclined blade (22) makes an angle of inclination ($\gamma$) of 45° to a horizontal plane and has a length equivalent to (0.25×$\Delta$). The four inclined blades (22) are placed orthogonally with respect to one another and are attached to the central shaft (4) at a height equivalent to (0.55×H) from the bottom head (2) of the vessel. The second stirring member comprises a lower turbine impeller (23) having four inclined blades (24). Each inclined blade (24) makes an angle of inclination ($\gamma$) of 45° to a horizontal plane and has a length equivalent to (0.35×$\Delta$). The four inclined blades (24) are arranged orthogonally with respect to one another and are attached to the central shaft (4) at a height equivalent to (0.15×H) from the bottom head (2) of the vessel. The central shaft (4) rotates in a rotation direction (S) such that the liquid polymerization reaction mixture contained in the reactor descends towards the bottom head (2) of the vessel along the axis (A) and then rises back up along the side wall (1) of the vessel thanks to the turbine impellers (21) and (23).

The mechanical stirring device also includes four baffles (25) of identical shape, two of which baffles (25) have been shown in FIG. 6. The baffles (25) are away from the side wall (1) of the vessel and are arranged symmetrically with respect to the axis (A) of the vessel and are equidistant from one another. Each baffle (25) has the shape of a hollow cylinder, having a vertical axis (A') away from the axis (A) of the central shaft (4) by a distance (l) such that the ratio (l/$\Delta$) is equal to 0.37. The cross section of the baffle (25) corresponds to the second shape as described above and especially shown schematically in FIG. 8, with in particular an internal structure of the double-wall jacketed type. The baffle (25) has a closed lower end (26) supported, via a solid support (27) against the side wall (1) of the vessel. It also has an upper end (28) which is connected to the top head (3) of the vessel and through which coaxial feed (29) and discharge (30) pipes for a heat transfer fluid pass. The pipes (29) and (30) connect a device (not shown in FIG. 6) for heating and/or cooling the heat-transfer fluid to the double-wall jacketed-type internal structure (31) of the baffle (25). The heat-transfer fluid for controlling the temperature of the liquid polymerization reaction mixture contained in the vessel flows through the internal structure (31). The baffle (25) has a vertical length (L) such that it is immersed over a portion of the height (h) of the liquid polymerization reaction mixture, and especially such that the ratio (L/h) is equal to 0.87.

Figure 7:
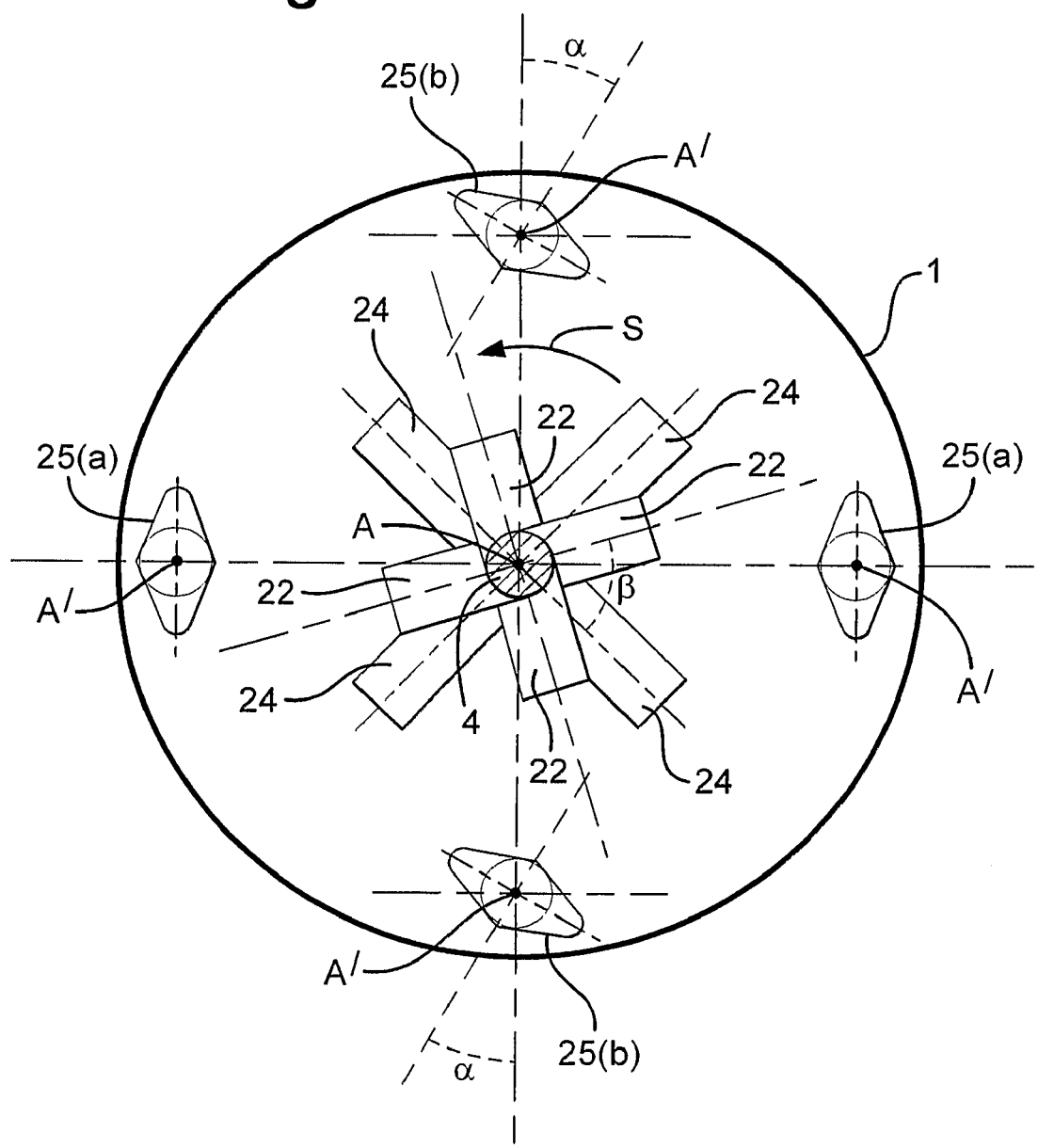
FIG. 7 is a vertical schematic view from the top in a cross section on CC' of the reactor shown in FIG. 6.

FIG. 7 is a vertical schematic view from the top in a cross section on CC' of the reactor shown in FIG. 6, in which view the elements common to the two figures are identified by the same references. The reactor has the shape of a vessel comprising the side wall (1) of the cylinder revolution of diameter ($\Delta$) and of vertical axis (A). The vessel is provided with a mechanical stirring device that includes the central rotation shaft (4), which has a vertical axis coincident with the axis (A) and which rotates in the rotation direction (S).

The mechanical stirring device also includes a system of two stirring members, which comprises the upper turbine impeller (21) having four inclined blades (22) and the lower turbine impeller (23) having four inclined blades (24). Each inclined blade (22) makes an angle of inclination ($\gamma$) of 45° to a horizontal plane and has a length equivalent to (0.25×$\Delta$). The four inclined blades (22) are arranged orthogonally with respect to one another and are attached in the upper portion of the central rotation shaft (4). Each inclined blade (24) makes an angle of inclination ($\gamma$) of 45° to a horizontal plane and has a length equivalent to (0.35×$\Delta$). The four inclined blades (24) are arranged orthogonally with respect to one another and are attached in the lower portion of the central rotation shaft (4). The orthogonal arrangement of the four inclined blades (22) is offset around the axis (A) by an angle ($\beta$) equal to 60° relative to the orthogonal arrangement of the four inclined blades (24).

The mechanical stirring device furthermore includes the four baffles (24) which are away from the side wall (1) of the vessel and are arranged symmetrically with respect to the axis (A) of the vessel and are equidistant from one another. Each baffle (25) has the shape of a hollow cylinder having a vertical axis (A'). The vertical axis (A') is away from the axis (A) of the central shaft (4) by a distance (l) such that the ratio (l/Δ) is equal to 0.37. The cross section of the baffle (25) corresponds to the second shape as described above and is shown schematically in FIG. 8. More particularly, the shape of the cross section of the baffle (25) comprises a rhombus having:

(i) a long diagonal and a short diagonal having respective lengths (D) and (d) such that the ratio (d/D) is equal to 0.33/1, the short diagonal being directed along a radial direction relative to the axis (A) (especially for two baffles (25(a)) diametrically opposed with respect to the axis (A)), or directed along a direction making an angle (α) equal to 30° to the said radial direction (especially for two baffles (25(b)) diametrically opposed with respect to the axis (A)); and (ii) each of the two acute angles located at the ends of the long diagonal being replaced with an identical circular arc, having a centre located on the long diagonal, a radius of length (r) such that the ratio (2r/d) is equal to 0.44/1, and two ends joining the respective two sides of the acute angle.

Figure 8:
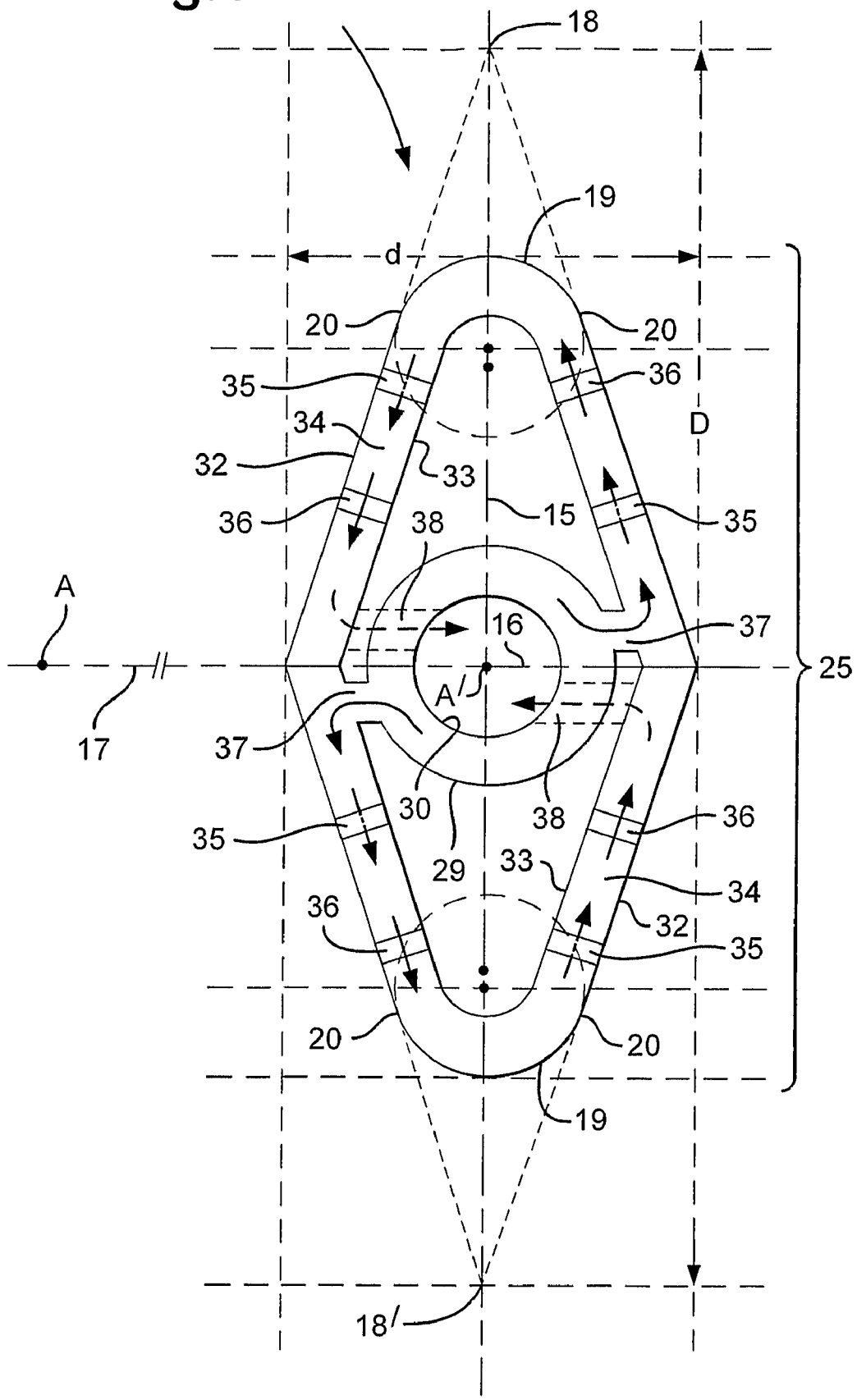
FIG. 8 is a schematic vertical view from the top in a cross section on DD' of one of the baffles with an internal structure of the double-wall jacketed type, as shown in FIG. 6.

FIG. 8 shows schematically the cross section of a preferred baffle (25) according to the invention and as shown schematically in FIGS. 6 and 7. The baffle (25) has a shape comprising a hollow cylinder having a vertical axis (A') and a cross section corresponding to the second shape as described above, that is to say the shape of a rhombus having:

(i) a long diagonal (15) and a short diagonal (16) having respective lengths (D) and (d) such that the ratio (d/D) is equal to 0.33/1, the short diagonal (16) being directed along a radial direction (17) with respect to the axis (A) of the vessel (especially for the baffles (25(a))) (or directed along a direction making an angle (α) equal to 30° to the said radial direction for the baffles (25(b)) that are not shown in FIG. 8), and the centre of the rhombus corresponding to the point through which the axis (A') of the baffle (25) passes; and (ii) each of the two acute angles (18) and (18') located at the ends of the long diagonal (15) being replaced with an identical circular arc (19), having a centre (A") on the long diagonal (15), a radius of length (r) such that the ratio (2r/d) is equal to 0.44/1, and two ends (20) joined to the two respective sides of the acute angle to which the circular arc (19) is joined, in particular along a tangent to the circular arc (19) which, at the joining point, is coincident with the direction of the said sides.

FIG. 8 also shows that the baffle (25) is in the form of a hollow cylinder comprising an internal structure of the double-wall jacketed type, in which a heat-transfer fluid capable of moving and/or supplying heat to the liquid polymerization reaction mixture contained in the reactor circulates. Thus, the baffle (25) comprises an outer wall (32) having the shape of the baffle (25) described above and an inner wall (33) similar in shape to the outer wall, in such a way that an open space (34) is left between the two walls, in which the heat-transfer fluid circulates in the form of a stream along directions as shown by arrows in FIG. 8. The open space (34) is divided by vertical partitions (35) and (36) which allow free passage in the lower region and in the upper region of the double-walled jacket, respectively. Moreover, the internal central region of the baffle (25) is occupied by two cylindrical pipes, which are coaxial and of vertical axis coincident with the axis (A') of the baffle, namely an external, heat-transfer fluid feed, pipe (29) and an internal, heat-transfer discharge, pipe (30). Openings and communications (37) made between the external pipe (29) and the inner wall (33) allow the heat-transfer fluid to be introduced into the open space (34) of the double-walled jacket. Similarly, openings and communications (38) made between the inner wall (33) and the internal pipe (30) allow the heat-transfer fluid to be removed from the double-walled jacket. The openings and communications (37) are preferably located in the upper portion of the double-walled jacket, whereas the openings and communications (38) are located in the lower portion of the double-walled jacket. The elements of the structure of the double-walled jacket that are common to FIGS. 6 and 8 are identified by the same references.

Figure 9:
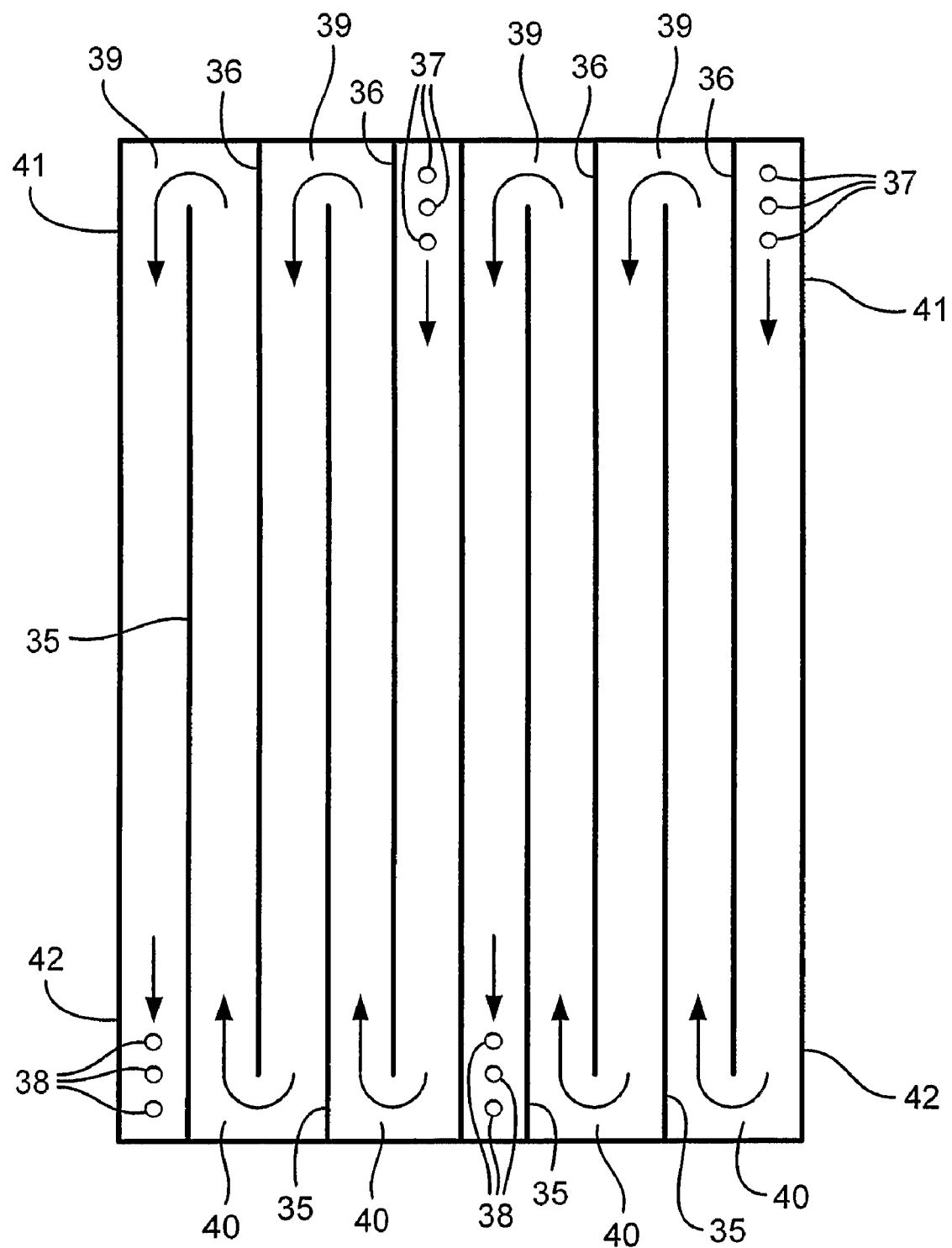
FIG. 9 is a longitudinal developed schematic view of the internal structure of the double-wall jacketed type of the baffle as shown in FIGS. 6 and 8.

FIG. 9 is a longitudinal developed schematic view of the internal structure of the double-walled jacket type of the baffle (25), as shown in FIGS. 6 and 8. The double-walled jacket has vertical partitions (35) and (36) that leave free passages (39) and (40) in the upper portion (41) and the lower portion (42) of the double-walled jacket, respectively. The openings and the communications (37) are located in the upper portion (41) of the double-walled jacket, which thus communicates with the external, heat-transfer fluid feed, pipe (29). Likewise, the openings and the communications (38) are located in the lower portion (42) of the double-walled jacket, which thus communicates with the internal, heat-transfer fluid discharge, pipe (30). The heat-transfer fluid enters the double-walled jacket via the openings and the communications (37), then circulates in the double-walled jacket, guided by the partitions (35) and (36) in the form of a stream along directions such as those shown in FIG. 8 by arrows, and is removed from the double-walled jacket via the openings and the communications (38).

The mechanically stirred reactor as shown schematically in FIGS. 1, 2 and 4 may be used in particular in a process for manufacturing a standard polystyrene by bulk polymerization of styrene, as described in U.S. Pat. No. 3,884,766. It may also be used in a process for manufacturing a high-impact polystyrene (or HIPS) by the bulk polymerization of styrene and the grafting onto a polybutadiene, described in U.S. Pat. Nos. 3,903,202, 4,254,236 and 5,189,095.

The mechanically stirred reactor as shown schematically in FIGS. 6, 7, 8 and 9 may be used in particular in a process for manufacturing an expandable polystyrene in the form of beads by the polymerization of styrene in aqueous suspension, as described in European Patent Application EP 0 969 037 A1 or in U.S. Pat. No. 4,497,911.

The invention claimed is:

1. Process for the (co)polymerization of styrene, carried out by employing a liquid polymerization reaction mixture that includes styrene, in a mechanically stirred reactor in the form of a vessel comprising a side wall having the shape of a cylinder of revolution with a vertical axis (A), a bottom head and a top head that are joined to the side wall, the vessel being provided with a mechanical stirring device comprising (i) a central shaft of vertical axis coincident with the axis (A), connected to a drive system comprising a motor for rotating the central shaft, (ii) at least one stirring member attached to the central shaft and (iii) at least one baffle attached to the vessel, wherein the baffle is away from the side wall of the vessel and takes the form of a cylinder of vertical axis and of cross section chosen from one of the three following shapes:

a first shape comprising a rhombus possessing a long diagonal and a short diagonal, which have respective lengths (D) and (d) such that the ratio (D/d) is chosen within a range from 0.1/1 to 0.9/1, the short diagonal being directed along a radial direction with respect to the axis (A) or along a direction making an angle (α) of greater than 0 and less than or equal to 45° to the said radial direction;

a second shape comprising a rhombus identical to that of the first shape, except that each of the two acute angles located at the ends of the long diagonal is replaced with an identical or different circular arc, having a centre located on the long diagonal, a radius of length (r) such that the ratio (2r/d) is chosen within a range from 0.1/1 to 0.8/1, and two ends contiguous with the two respective sides of the acute angle; and a third shape comprising a rhombus identical to that of the second shape, except that only the acute angle located at the end of the long diagonal and facing in the opposite direction to the rotation of the central shaft is replaced with the circular arc.

2. Process according to claim 1, wherein the stirring member or members are chosen from members generating radial flow.

3. Process according to claim 1, wherein the stirring member or members are chosen from dual-flow screw impellers, screw impellers with thin-profile blades or profiled blades, turbine impellers with inclined blades, single-spiral or double-spiral Archimedian screws and single-, double-, triple- or quadruple-helical ribbon stirrers, optionally combined with an Archimedian screw.

4. Process according to claim 1, wherein the stirring member or members are chosen from screw impellers having thin-profile blades or profiled blades and inclined turbine impellers, and from among single-, double- or triple-helical ribbon stirrers.

5. Process according to claim 1, wherein the stirring member or members are chosen from single-, double- or triple-helical ribbon stirrers, combined with a bottom stirring member.

6. Process according to claim 1, wherein the ratio (d/D) is chosen within a range from 0.2/1 to 0.8/1.

7. Process according to claim 1, wherein the ratio (2r/d) is chosen within a range from 0.2/1 to 0.7/1.

8. Process according to claim 1, wherein, in the second or third shape of the cross section of the baffle, each end of the circular arc is joined to the respective side of the acute angle to which the arc is joined, along a tangent to the circular arc which, at the joining point, is coincident with the direction of the said side.

9. Process according to claim 1, wherein the styrene (co)polymerization is a radical polymerization reaction initiated thermally or using at least one catalyst that generates free radicals.

10. Process according to claim 1, wherein the liquid polymerization reaction mixture comprises:

styrene and, optionally, at least one comonomer, a natural or synthetic rubber, and/or at least one polymerization initiator; or styrene, an organic solvent and, optionally, at least one comonomer, a natural or synthetic rubber, and/or a polymerization initiator; or styrene, water, at least one suspension or emulsion stabilizer and, optionally, at least one comonomer, a natural or synthetic rubber, and/or at least one polymerization initiator.

11. Process according to claim 1, wherein the stirring member or members generate a shear rate of 2 to 60 $s^{-1}$.

12. Process according to claim 1, wherein the central shaft rotates at a speed of 10 to 50 revolutions per minute.

13. Process according to claim 1, wherein the stirring member or members are chosen from members generating axial or essentially axial flow.

14. Process according to claim 4, wherein the stirring member or members are chosen from screw impellers having thin-profile blades or profiled blades and inclined turbine impellers in an aqueous suspension polymerization process, and from among single-, double- or triple-helical ribbon stirrers in a bulk or solution polymerization process.

15. Process according to claim 5, wherein the stirring member or members are chosen from single-, double- or triple-helical ribbon stirrers, combined with a bottom stirring member having the shape of an anchor and which is attached to the same central rotation shaft.

16. Process according to claim 6, wherein the ratio (d/D) is chosen within a range from 0.25/1 to 0.65/1.

17. Process according to claim 7, wherein the ratio (2r/d) is chosen within a range from 0.35/1 to 0.65/1.

18. Process according to claim 10, wherein the natural or synthetic rubber is a polybutadiene and the polymerization initiator is a free radical generator.

19. Process according to claim 11, wherein the stirring member or members generate a shear rate of 5 to 50 $s^{-1}$.

20. Process according to claim 12, wherein the central shaft rotates at a speed of 12 to 45 revolutions per minute.

21. Polymerization apparatus, capable of (co)polymerizing styrene, comprising a mechanically stirred reactor in the form of a vessel comprising a side wall having the shape of a cylinder of revolution with a vertical axis (A), a bottom head and a top head that are joined to the side wall, the vessel being provided with a mechanical stirring device comprising (i) a central shaft of vertical axis coincident with the axis (A), connected to a drive system comprising a motor for rotating the central shaft, (ii) at least one stirring member attached to the central shaft and (iii) at least one baffle attached to the vessel, wherein the baffle is away from the side wall of the vessel and takes the form of a cylinder of vertical axis and of cross section chosen from one of the three following shapes:

a first shape comprising a rhombus possessing a long diagonal and a short diagonal, which have respective lengths (D) and (d) such that the ratio (d/D) is chosen within a range from 0.1/1 to 0.9/1, the short diagonal being directed along a radial direction with respect to the axis (A) or along a direction making an angle (α) of greater than 0 and less than or equal to 45° to the said radial direction;

a second shape comprising a rhombus identical to that of the first shape, except that each of the two acute angles located at the ends of the long diagonal is replaced with an identical or different circular arc, having a centre located on the long diagonal, a radius of length (r) such that the ratio (2r/d) is chosen within a range from 0.1/1 to 0.8/1, and two ends contiguous with the two respective sides of the acute angle; or a third shape comprising a rhombus identical to that of the second shape, except that only the acute angle located at the end of the long diagonal and facing in the opposite direction to the rotation of the central shaft is replaced with the circular arc.

22. Apparatus according to claim 21, wherein the stirring member or members are chosen from members generating radial flow.

23. Apparatus according to claim 21, wherein the stirring member or members are chosen from dual-flow screw impellers, screw impellers with thin-profile blades or profiled blades, turbine impellers with inclined blades, single-spiral or double-spiral Archimedian screws and single-, double-, triple- or quadruple-helical ribbon stirrers.

24. Apparatus according to claim 21, wherein the stirring member or members are chosen from single-, double-, triple- or quadruple-helical ribbon stirrers, combined with a bottom stirring member.

25. Apparatus according to claim 21, wherein the ratio (d/D) is chosen within a range from 0.2/1 to 0.8/1.

26. Apparatus according to claim 21, wherein the ratio (2r/d) is chosen within a range from 0.2/1 to 0.7/1.

27. Apparatus according to claim 21, wherein, in the second or third shape of the cross section of the baffle, each end of the circular arc is joined to the respective side of the acute angle to which the arc is joined, along a tangent to the circular arc which, at the joining point, is coincident with the direction of the said side.

28. Apparatus according to claim 21, wherein the stirring member or members are chosen from members generating axial or essentially axial flow.

29. Apparatus according to claim 23, wherein the stirring member or members are combined with an Archimedian screw.

30. Apparatus according to claim 24, wherein the bottom stirring member has the shape of an anchor.

31. Apparatus according to claim 25, wherein the ratio (d/D) is chosen within a range from 0.25/1 to 0.65/1.

32. Apparatus according to claim 26, wherein the ratio (2r/d) is chosen within a range from 0.35/1 to 0.65/1.

* * * * *